United States Patent
Randall et al.

(10) Patent No.: US 8,543,700 B1
(45) Date of Patent: Sep. 24, 2013

(54) ASYNCHRONOUS CONTENT TRANSFER

(75) Inventors: Craig Randall, Pleasanton, CA (US); Alex Rankov, Danville, CA (US); Meir Amiel, Pleasanton, CA (US); Oleg Bivol, Toronto (CA)

(73) Assignee: EMC Corporation, Hopkinton, MA (US)

( * ) Notice: Subject to any disclaimer, the term of this patent is extended or adjusted under 35 U.S.C. 154(b) by 947 days.

(21) Appl. No.: 11/823,608

(22) Filed: Jun. 28, 2007

(51) Int. Cl.
*G06F 13/00* (2006.01)

(52) U.S. Cl.
USPC .............. 709/226; 709/229; 709/223

(58) Field of Classification Search
USPC ............ 709/226, 229, 223, 212–214
See application file for complete search history.

(56) References Cited

U.S. PATENT DOCUMENTS

| | | | |
|---|---|---|---|
| 5,333,312 A | 7/1994 | Wang | |
| 6,389,422 B1 | 5/2002 | Doi et al. | |
| 6,757,712 B1 * | 6/2004 | Bastian et al. | 709/206 |
| 6,804,674 B2 | 10/2004 | Hsiao et al. | |
| 6,832,253 B1 * | 12/2004 | Auerbach | 709/226 |
| 6,879,998 B1 | 4/2005 | Raciborski et al. | |
| 7,139,811 B2 | 11/2006 | Lev Ran et al. | |
| 7,284,017 B2 * | 10/2007 | Baune | 707/200 |
| 7,340,571 B2 * | 3/2008 | Saze | 711/154 |
| 7,558,837 B1 | 7/2009 | Denny | |
| 7,761,572 B1 * | 7/2010 | Auerbach | 709/226 |
| 7,996,535 B2 * | 8/2011 | Auerbach | 709/226 |
| 2002/0198937 A1 | 12/2002 | Diwan et al. | |
| 2003/0050979 A1 | 3/2003 | Takahashi | |
| 2003/0065739 A1 | 4/2003 | Shnier | |
| 2003/0187956 A1 | 10/2003 | Belt et al. | |
| 2003/0229645 A1 | 12/2003 | Mogi et al. | |
| 2004/0111398 A1 * | 6/2004 | England et al. | 707/3 |
| 2004/0148344 A1 | 7/2004 | Navar et al. | |
| 2004/0216084 A1 | 10/2004 | Brown et al. | |
| 2005/0010653 A1 | 1/2005 | McCanne | |
| 2005/0044260 A1 | 2/2005 | Abramson et al. | |
| 2005/0120050 A1 * | 6/2005 | Myka et al. | 707/104.1 |
| 2005/0149575 A1 * | 7/2005 | Baune | 707/200 |
| 2005/0160154 A1 | 7/2005 | Raciborski et al. | |
| 2005/0216524 A1 | 9/2005 | Gomes et al. | |
| 2005/0235282 A1 | 10/2005 | Anderson | |
| 2005/0246393 A1 | 11/2005 | Coates et al. | |
| 2005/0267950 A1 | 12/2005 | Kitamura | |
| 2006/0041614 A1 | 2/2006 | Oe | |
| 2006/0053250 A1 * | 3/2006 | Saze | 711/114 |
| 2006/0064536 A1 | 3/2006 | Tinker et al. | |
| 2006/0080546 A1 | 4/2006 | Brannon et al. | |
| 2006/0294223 A1 | 12/2006 | Glasgow et al. | |
| 2008/0177803 A1 * | 7/2008 | Fineberg et al. | 707/202 |

OTHER PUBLICATIONS

U.S. Appl. No. 11/229,318, Oscherov et al.
U.S. Appl. No. 11/229,036, Oscherov et al.
U.S. Appl. No. 11/229,317, Oscherov et al.

* cited by examiner

*Primary Examiner* — Kenneth R Coulter
(74) *Attorney, Agent, or Firm* — Van Pelt, Yi & James LLP

(57) ABSTRACT

Managing content is disclosed. An indication that a remote host desires to write a content data to a data repository is received. The remote host is caused to transfer the content data to a branch content store that is nearer to the remote host than the data repository is near to the remote host, by a prescribed measure, and that is configured to transfer the content data asynchronously to the data repository.

16 Claims, 6 Drawing Sheets

ASYNCHRONOUS CONTENT TRANSFER

BACKGROUND OF THE INVENTION

Some enterprises that have geographically distributed users store vast amounts of data in a central data center. Some use a content management system and/or application to manage and provide controlled access to content data stored in the data center. However, in some cases users are widely dispersed, for example around the world, and access content management services via network communications, e.g., web services. In some such cases, users may experience slow response due to long network communication lag times, especially when writing large amounts of data to the data center.

BRIEF DESCRIPTION OF THE DRAWINGS

Various embodiments of the invention are disclosed in the following detailed description and the accompanying drawings.

DETAILED DESCRIPTION

Figure 1:
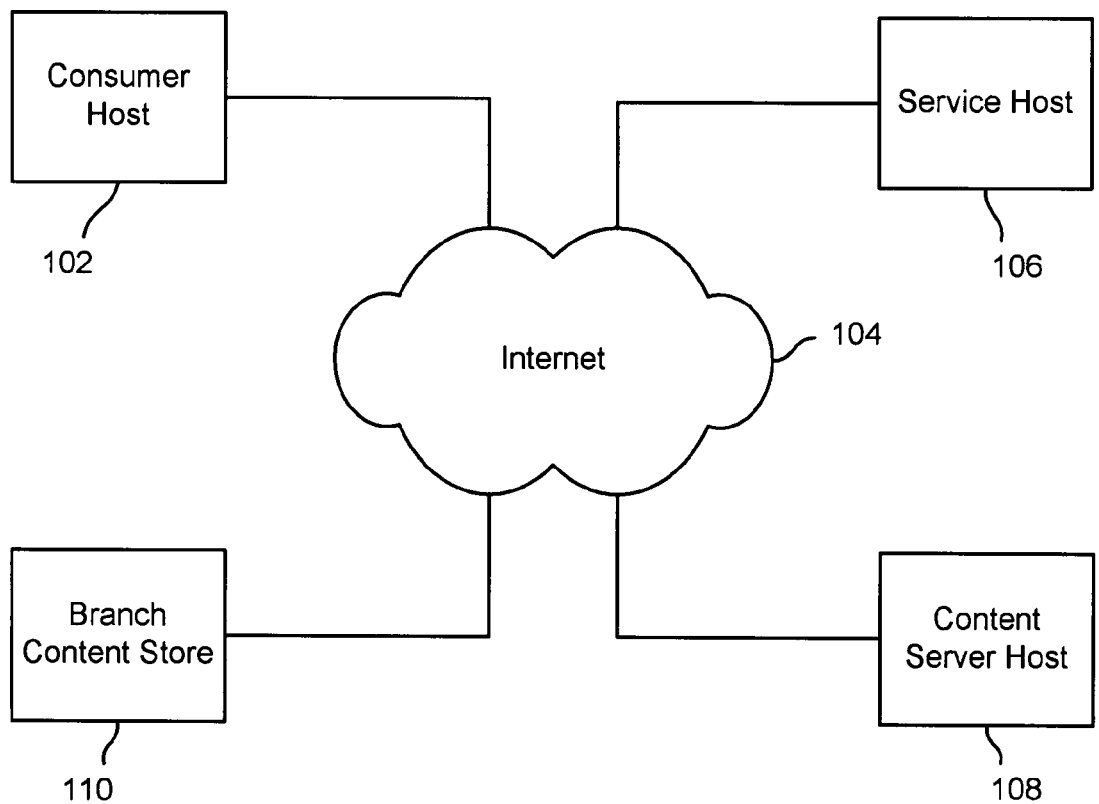
FIG. 1 is a block diagram illustrating an embodiment of a system for asynchronous content transfer.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Asynchronous content transfer is disclosed. Under control of a centralized content management process, content is written, e.g., by a client host, directly to a branch content store located nearer by some measure (e.g., geographic distance, communication lag time, etc.) than a central data repository of the content management process. The branch content store later writes the content data to the central repository asynchronously, freeing the client host and the communication bandwidth between the client host and the content management process to be used for other tasks. In some embodiments, a request to read the content data prior to its having been transferred asynchronously may result in the content data being made available directly from the branch content store, e.g., by providing to a requesting entity a URL or other locator usable to retrieve the content data directly from the branch content store. In some cases, a synchronous write to a branch content store and/or to a data center may be performed. In some embodiments, content is cached at and made available to nearby users from a branch content store. In various embodiments, content caching at a branch content store, synchronous writing to a branch content store and/or central data repository, and/or asynchronous writing to a central data center thru a local cache (such as a branch content store) are requested by a consumer via a web services request indicating the type of write operation that is desired.

FIG. 1 is a block diagram illustrating an embodiment of a system for asynchronous content transfer. In the example shown, a consumer host 102 communicates via the Internet 104 (and/or one or more other public and/or private networks) with a service host 106, e.g., to use a content management related service available on service host 106, such as a web service. The service host 106 is connected via the Internet 104 to a content server host 108, which in various embodiments provides access to and manages content stored in an associated data repository. In some embodiments, content server host 108 comprises a data center or other centralized data repository. A branch content store host 110 likewise is connected to and accessible via the Internet 104. In the example shown, branch content store host 110 is shown adjacent to consumer host 102 and physically nearer to consumer host 102 than content server host 108, to suggest that in this example the branch content store host 110 is nearer to consumer host 102 than content server host 108 is by some applicable measure, such as geography, network topography, round trip communication latency, etc. In some embodiments, asynchronous transfer of content from a consumer host such as consumer host 102 and a data repository such as one associated with content server host 108 is accomplished by first causing content data to be transferred from the consumer host 102 to the branch content store host 110. The branch content store host 110 then transfers the content to the data repository associated with content server host 108 either synchronously or asynchronously, depending on a preference expressed by the user, e.g., in a configuration data, in the request, etc. For example, in the case where an asynchronous transfer is specified, the branch content store host 110 may transfer the content at a subsequent time and/or decoupled from subsequent activity by consumer host 102 and in particular subsequent use of communication facilities and/or bandwidth between consumer host 102 on the one hand and service host 106 and/or content server host 108 on the other. In some embodiments, consumer host 102 may specify that a synchronous transfer be performed, in which case content data is transferred directly from consumer host 102 to content server host 108. In some embodiments, content transfer is initiated by a consumer process on consumer host 102 sending a request or other communication to a service on service host 106, e.g., a web services request. If the transfer is to be asynchronous, in some embodiments consumer host 102 receives from the service on service host 106 in return a URL or other locator indicating a location on branch content store host 110 to which the content is to be transferred as an initial matter. Branch content store 110 then transfers the content asynchronously to content server host 108. In some embodiments, the service on service host 106 obtains the URL or other locator from the content server host 108, e.g., in the manner described below in connection with FIG. 2.

Figure 2:
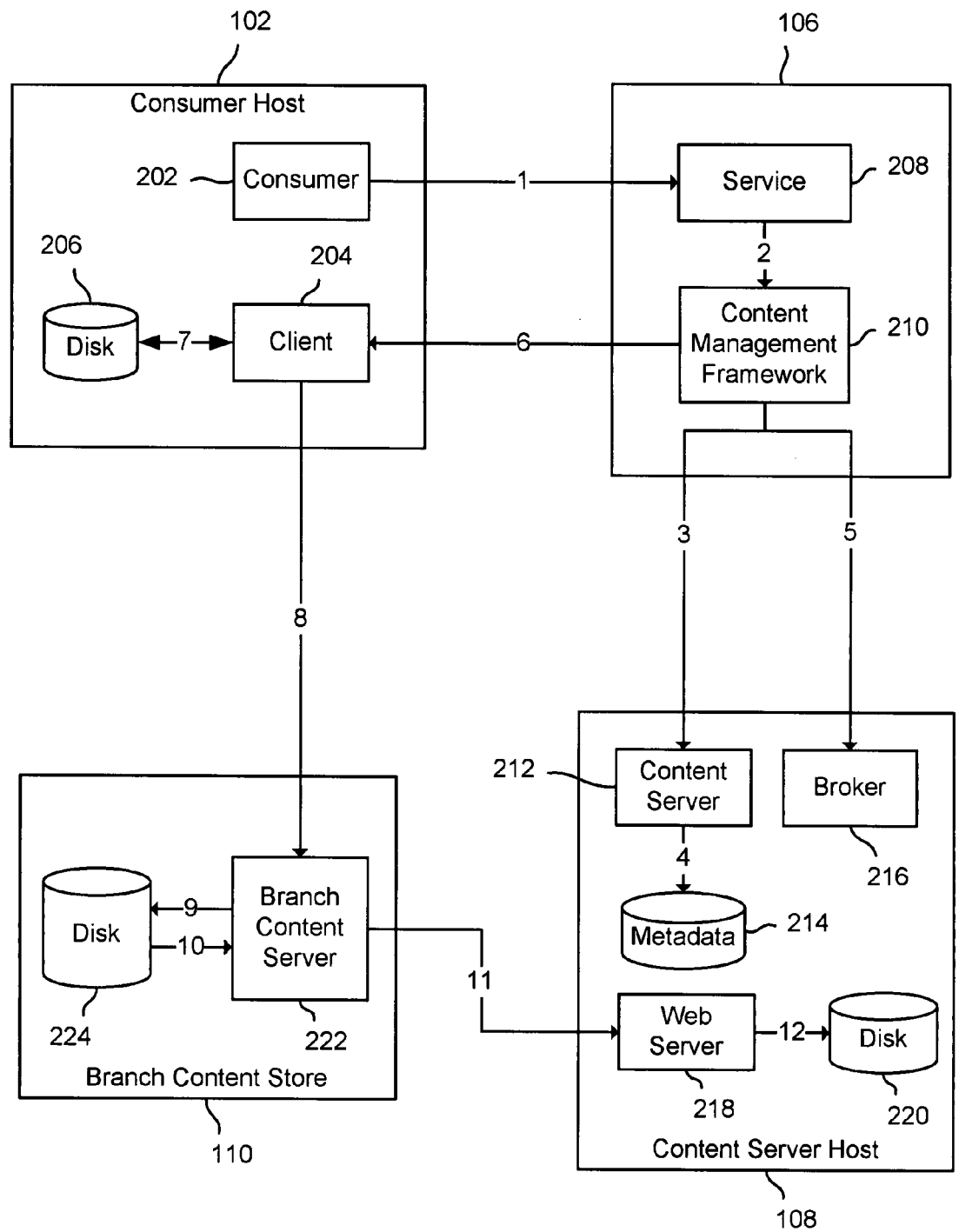
FIG. 2 is a flow diagram illustrating an embodiment of a system and process for asynchronous content transfer.

FIG. 2 is a flow diagram illustrating an embodiment of a system and process for asynchronous content transfer. In the example shown, consumer host 102 includes a consumer process 202 configured to access a service 208 on service host 106. Consumer host 102 further includes a content management client 204 and a disk 206. In some embodiments, the content management client 204 comprises a rich client configured to perform and/or participate in the performance of content management related functions and operations, as described more fully below. In addition to service 208, in the example shown service host 106 includes a content management framework 210. In some embodiments, content management framework 210 comprises a set of foundation classes, each configured to perform one or more content management related functions, and/or a framework for managing a body of content distributed across multiple hosts. In some embodiments, service 208 runs on top of content management framework 210 and uses associated classes and services of the framework to provide access to and/or management of content stored in a data repository, such as one associated with content server host 108. In the example shown, content server host 108 includes a content server 212 configured to provide access to and otherwise manage stored content. The content server 212 stores and uses metadata in a metadata store 214 to represent, track, provide access to, and perform other content management functions with respect to a body of managed content. In some embodiments, the body of managed content comprises content associated with one or more physical and/or logical repositories of content. In the example shown, at least a subset of the body of content is stored in a disk 220 on content server host 108. In some embodiments, all or part of the content in the one or more repositories is stored in one or more separate physical systems. In the example shown, direct access to content stored on disk 220 is provided via a web server 218. For example, to retrieve content, a consumer such as consumer 202 on consumer host 102 sends a request for the content to a service such as service 208, which interacts with content management framework 210 as required to obtain from content server 212 data required to provide a URL or other locator associated with a storage location at which the content is stored, e.g., on a disk such as disk 220. A rich client on the consumer host, such as client 204, then uses the URL or other locator to retrieve the content directly from the content server host 212, e.g., by sending an to web server 218 an HTTP GET request that includes the URL.

Using a similar direct approach to transfer content asynchronously is disclosed. Referring to the numbered arrows in the example shown in FIG. 2, consumer 202 sends to service 208 a request (arrow labeled "1") to write content to the repository, e.g., to store a new object or to update an existing one. The service 208 interacts (arrow "2") with content management framework 210 to obtain a location to which the content is to be transferred (initially). In some embodiments, the consumer 202 indicates, e.g., at the option of an administrator or other user of the consumer host 102, whether the transfer is to be asynchronous or synchronous. In some embodiments, the service 208 and/or associated logic evaluates the request and/or other information and determines whether the transfer will be asynchronous or synchronous. If synchronous, in some embodiments the service 208 obtains from the content server 212 via content management framework 210 a URL or other locator usable by client 204 on consumer host 102 to write the content directly to consumer server host 108, e.g., via web server 218 to be stored on disk 220. In some embodiment, the URL or other locator is usable by the client 204 on consumer host 102 to write the content to the branch content store, but the includes and/or is associated with data indicating to the branch content store that the transfer is to be synchronous. The process is synchronous in the sense that the client 204 writes to the branch content store (or in some embodiments directly to the repository), once it receives the URL or other locator, and waits for the transfer to the repository to be completed prior to moving on to other tasks. In the example shown in FIG. 2, the transfer is asynchronous. The content management framework 210 obtains a distributed content map from content server 212 (arrow "3") which accesses data stored in a metadata store 214 (arrow "4") to provide the distributed content map. In some embodiments, the distributed content map indicates where the most up-to-date version of each content item in a distributed body of managed content is stored. The content management framework 210 also retrieves (arrow "5") from a connection broker 216 on content server host 216 a repository map that identifies for each of one or more repositories, e.g., a repository identified in the request to write content, one or more branch content stores associated with the repository and/or geographic or other location information for each. The content management framework 210 uses the information retrieved from the content server 212 and connection broker 216 to form and send to client 204 on consumer host 102 (arrow "6") a URL or other locator indicating a location to which the content is to be transferred as an initial matter. In the example shown, the content management framework 210 has determined that by a relevant measure the distance (or time) from the consumer host 102 to branch content store host 110 is less than the corresponding distance (time) nearer to the consumer host 102 from the consumer host 102 to the content server host 108. Therefore, in this example the content management framework 210 would provide to client 204 a URL or other locator indicating a location on branch content store host 110 to which the content is to be transferred as an initial matter. In some embodiments, the branch content store 110 may be one of a plurality of branch content stores, e.g., each located near a cluster or other locus of consumer hosts such as consumer host 102, such as each in a corresponding office building or other physical location. The client 204 in this example reads the content from disk 206 on consumer host 102 (arrow "7") and transfers the content directly to the branch content store host 110 (arrow "8") using the URL or other locator received from content management framework 210 to tell the branch content store host 110 where to store the content pending asynchronous transfer to the data center (i.e., content server host 108 in this example). A branch content server 222 on branch content store host 110 receives the content and saves it (arrow "9") to a disk 224 on branch content store host 110. The branch content server reads the content (arrow "10") from disk 224 and transfers it asynchronously (arrow "11") to the content server host 108, via web server 218 in the example shown, where it is saved (arrow "12") to the disk 220. In some embodiments, the content server 212 monitors the transfer of the content first to the branch content store 110 and then to the content server host 108 and updates data in metadata store 214, e.g., the distributed content map described above, to maintain a current understanding of where the latest version of the content data is stored. In this way, the content server 212 has the information available to make the content available either from the branch content store 110 or the repository, depending on whether the asynchronous transfer from the branch content store 110 to the repository has been completed. In some embodiments, the branch content store retains or may be configured to retain subsequent to completing the asynchronous transfer to the repository a cached copy of the transferred content, and in such cases so long as the cache copy is the most current version the content server 212 has the option of making the content available directly from the branch content store, e.g., to a nearby host such as consumer host 102, rather than from the repository.

Figure 3:
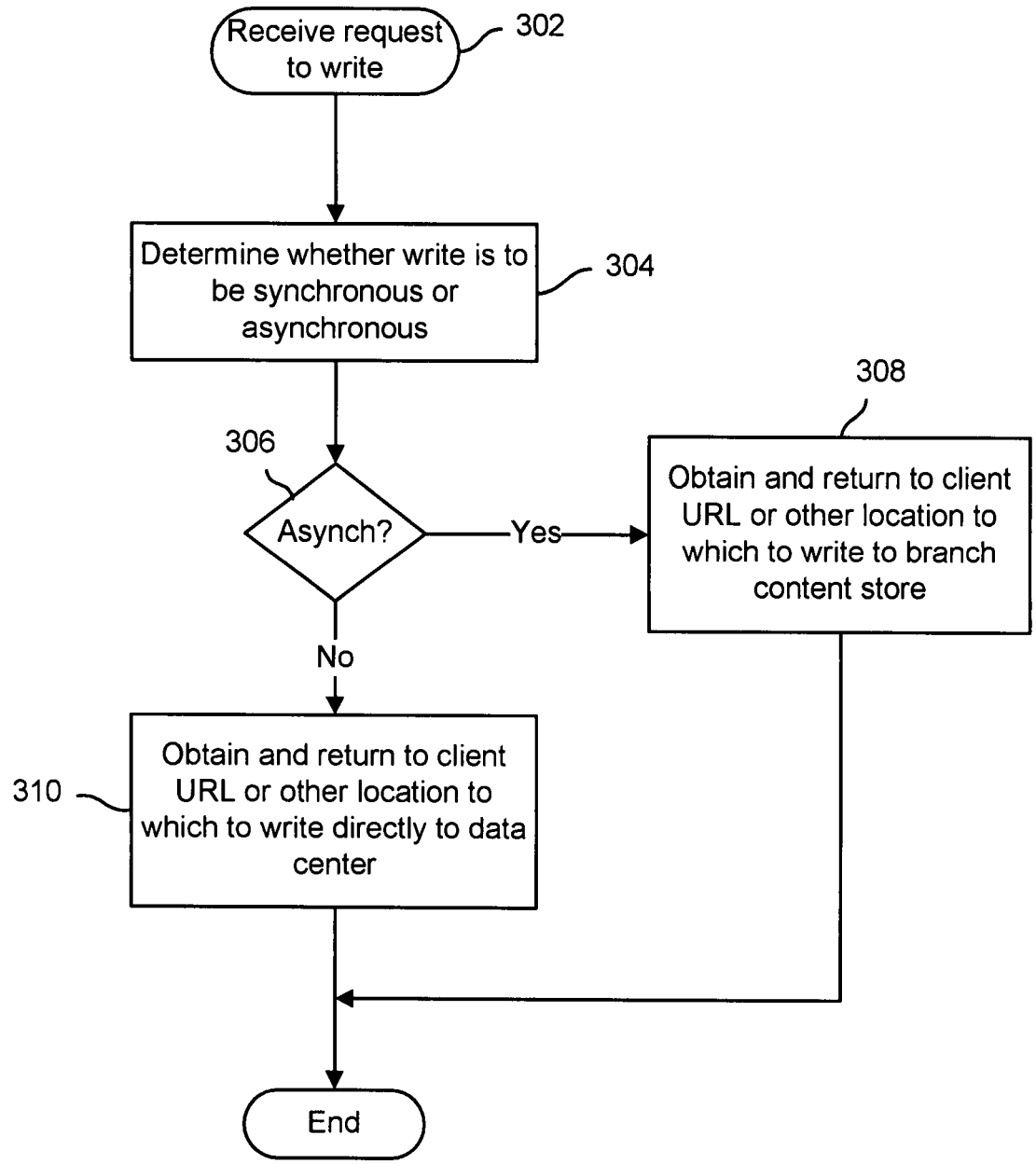
FIG. 3 is a flow chart illustrating an embodiment of a process for asynchronous content transfer.

FIG. 3 is a flow chart illustrating an embodiment of a process for asynchronous content transfer. In some embodiments, the process of FIG. 3 is implemented by a service such as service 208 of FIG. 2. In the example shown, on receiving a request to write (302), e.g., from a consumer such as consumer 202, it is determined whether the write is to be synchronous or asynchronous (304). As noted above, in various embodiments the sender of the request indicates whether a synchronous or asynchronous write is desired and/or the service or associated logic evaluates the request and/or associated data (e.g., size of file, observed network latency, etc.) and determines whether the write should be synchronous or asynchronous. If the write is to be asynchronous (306), a URL or other location on a branch content store host to which the content is to be transferred is obtained and returned to a content management client on the host from which the request was received (308), e.g., client 204. Otherwise (306), a URL or other location to which the content is to be written directly to the data center (i.e., the repository) is obtained and returned to the client (310).

Figure 4:
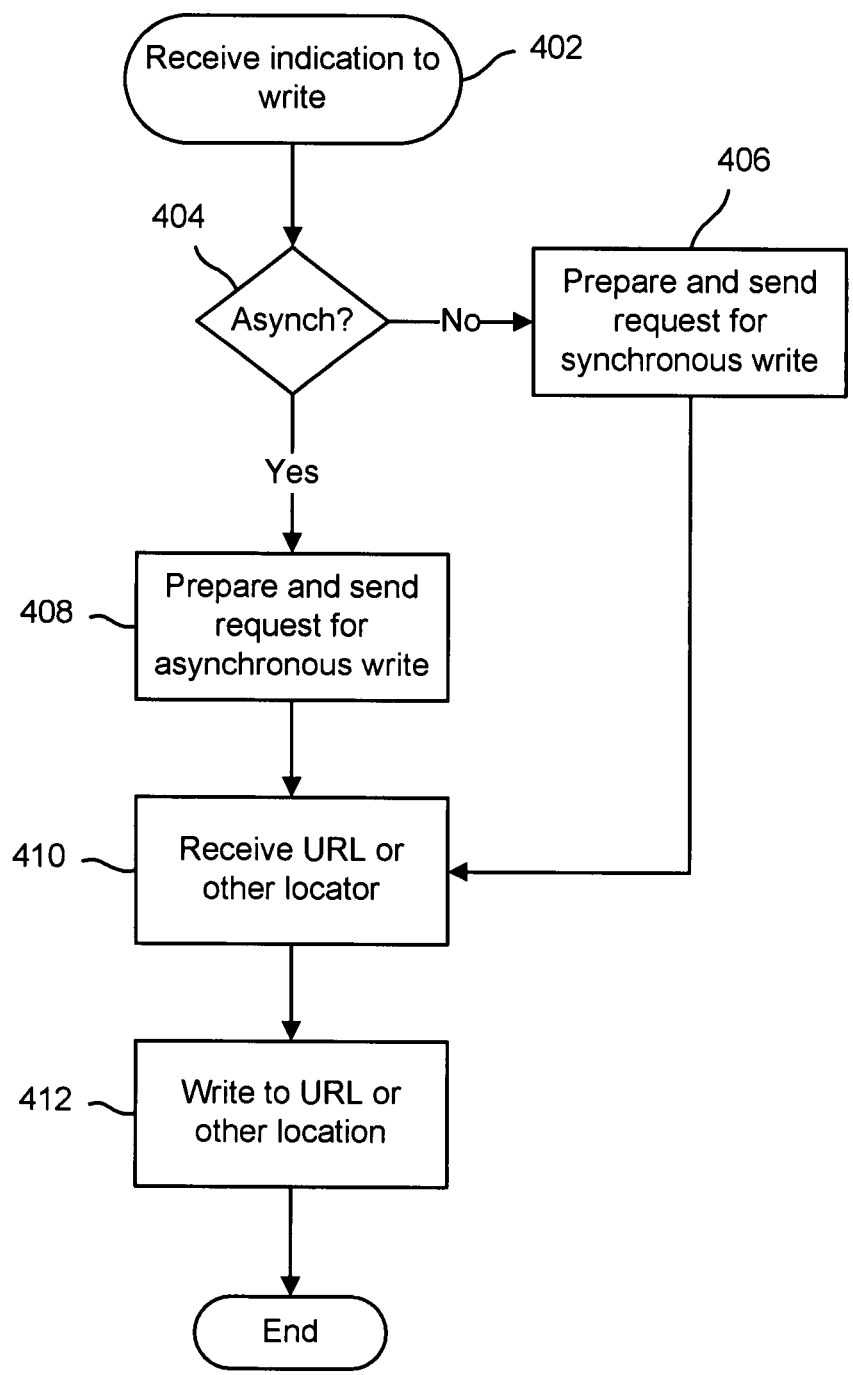
FIG. 4 is a flow chart illustrating an embodiment of a process for asynchronous content transfer.

FIG. 4 is a flow chart illustrating an embodiment of a process for asynchronous content transfer. In some embodiments, the process of FIG. 4 is implemented on a consumer host such as host 102. In the example shown, an indication that content is to be written is received (402), e.g., from an application or other process on the consumer host. It is determined whether the transfer is to be synchronous or asynchronous (404). For example, if the file is very large and/or latency in communications directly to the data center has been observed to be long, an asynchronous transfer may be selected dynamically. In some embodiments, an administrator or other user determines, at configuration time and/or at runtime, whether the configuration will be asynchronous. If the transfer is to be synchronous (404), a content management service consumer process (e.g., consumer 202) prepares and sends to a content management service (e.g., a web service) a request (e.g., a web services request) to perform a synchronous write (406). If the transfer is to be asynchronous (404), a request to perform an asynchronous write is prepared and sent (408). In either case, upon receiving a URL or other locator (410) the content is transferred to a destination host with which the URL or other locator is associated (412), e.g., a branch content store in the case of an asynchronous transfer or directly to the content server host in the case of a synchronous transfer. In some embodiments, the URL or other locator is received (410) and the content is transferred (412) by a content management client on the consumer host, such as client 204.

Figure 5:
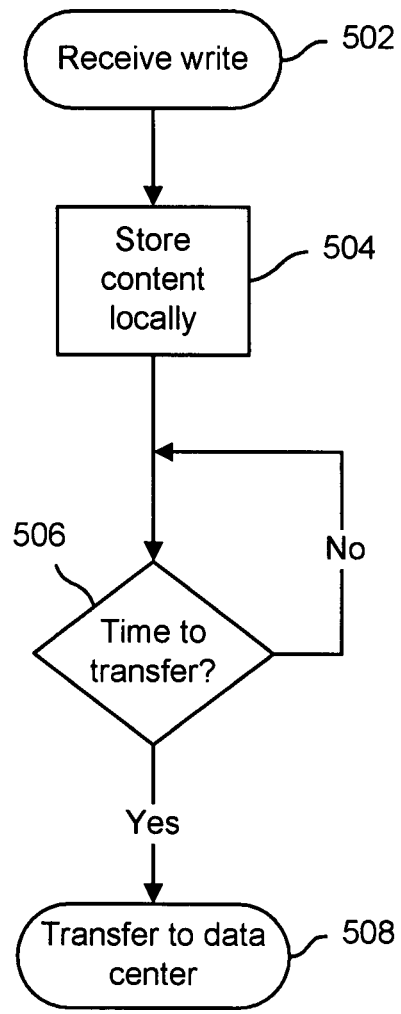
FIG. 5 is a flow chart illustrating an embodiment of a process for asynchronous content transfer.

FIG. 5 is a flow chart illustrating an embodiment of a process for asynchronous content transfer. In some embodiments, the process of FIG. 5 is implemented on a branch content store host, e.g., by a branch content server such as server 222. In the example shown, when transferred content is received (502) it is stored locally (504), e.g., to disk 224. When the time to perform further transfer the content, asynchronously, to the data center comes (506), the content is transferred to the data center (508), e.g., to content server host 108 in the example shown in FIGS. 1 and 2. In various embodiments, the branch content store may be configured to initiate an asynchronous transfer as soon as received content has been stored locally at the branch content store host and/or at a later and/or different time, e.g., late at night or some other time of low network or other communication path and/or repository activity.

Figure 6:
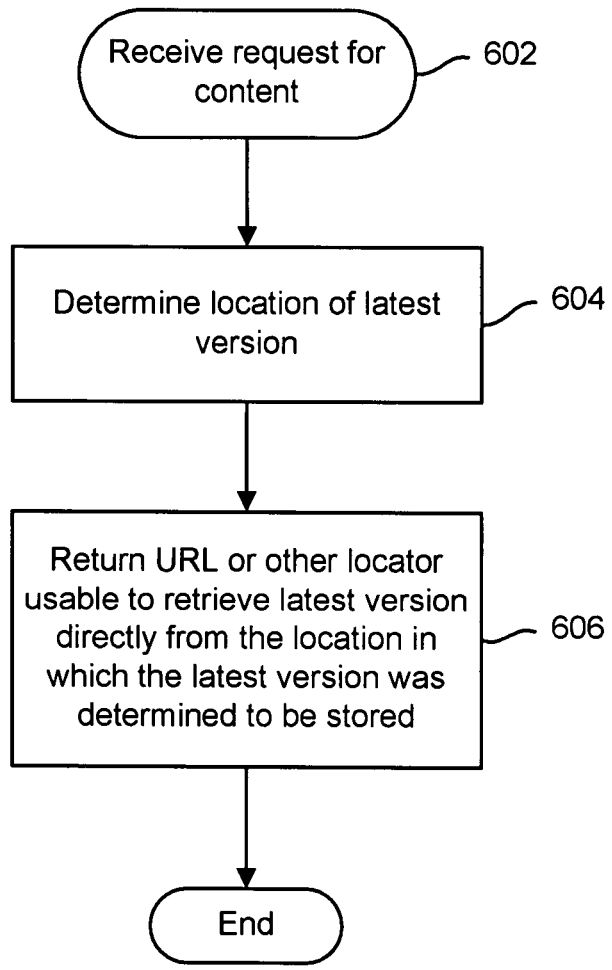
FIG. 6 is a flow chart illustrating an embodiment of a process for providing access to distributed managed content, in an environment in which at least some content may be transferred asynchronously.

FIG. 6 is a flow chart illustrating an embodiment of a process for providing access to distributed managed content, in an environment in which at least some content may be transferred asynchronously. In some embodiments, the process of FIG. 6 is implemented in whole or part by a content server, such as content server 212, and/or a content management framework, such as framework 210. In the example shown, a request to retrieve content is received (602). A location of a latest (i.e., most current) version of the content is determined (604). In some embodiments, a distributed content map such as described above is used to determine one or more locations in which the most current version is stored. In some embodiments, if the most current version is available from multiple locations, a location nearest the requesting host is determined, e.g., using a repository map such as described above. Once the location is determined (and/or selected) (604), a URL or other locator usable to retrieve the most current version directly from the determined and/or selected location is formed and returned to the requesting host.

Asynchronous transfer of content to a central data repository, as described herein, decouples the transfer of raw content data from other tasks, freeing associated hosts to perform other tasks as needed while content transfer occurs asynchronously.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method executing on hardware of managing content, comprising:
   receiving an indication that a remote host desires to write a content data to a data repository, wherein the remote host is caused to transfer the content data nearby in the event the remote host provides an additional indication that the remote host desires the content data to be transferred to the data repository asynchronously;
   determining a branch content store that is nearer to the remote host than the data repository is near to the remote host, by a prescribed measure;
   causing the remote host to transfer the content data to the branch content store, wherein the branch content store is configured to transfer the content data asynchronously to the data repository; and
   making the content data available directly from the branch content store if a request to retrieve the content data from the data repository is received prior to the content data having been transferred asynchronously from the branch content store to the data repository.

2. A method as recited in claim 1, wherein the indication that the remote host desires to write the content data to the data repository is received from the remote host.

3. A method as recited in claim 1, wherein the indication includes an indication that the remote host desires the content to be transferred to the data repository asynchronously.

4. A method as recited in claim 1, wherein the content data is transferred from the remote host directly to the data repository in the event the remote host provides an indication that the remote host desires the transfer to be synchronous.

5. A method as recited in claim 1, wherein causing the remote host to transfer the content data to the branch content store comprising providing to the remote host a URL or other locator associated with a storage location on a host with which the branch content store is associated.

6. A method as recited in claim 1, wherein the indication is received at a service associated with the data repository.

7. A method as recited in claim 6, wherein the service comprises a web service.

8. A method as recited in claim 6, wherein the remote host comprises a consumer process that is a consumer of the service.

9. A method as recited in claim 1, wherein the remote host comprises a content management client configured to transfer the content data to the branch content store.

10. A method as recited in claim 1, wherein the remote host comprises a content management client configured to transfer content to the branch content store or directly to the data repository in response to receiving an instruction indicating a destination to which a particular content is to be transferred.

11. A method as recited in claim 1, further comprising maintaining a distributed content map indicating for each content data associated with the data repository a current location in which a latest version of the content data is stored.

12. A method as recited in claim 11, wherein the current location may be one of a plurality of locations in which the latest version of the content data is stored and the distributed content map indicates each such location.

13. A method as recited in claim 1, wherein the data repository is associated with a content management system.

14. A method as recited in claim 13, wherein the content management system is configured to store a metadata associated with the content data.

15. A method as recited in claim 1, further comprising storing in a metadata store associated with the data repository said metadata associated with the content data.

16. A method as recited in claim 1, wherein the prescribed measure is based at least in part on one or more of the following: geography, geographic distance, communication lag time, network topography, and round trip communication latency.

* * * * *